(12) United States Patent
Krasilnikov et al.

(10) Patent No.: US 12,519,851 B2
(45) Date of Patent: Jan. 6, 2026

(54) DISTRIBUTED AND SYNCHRONIZED NETWORK CORE FOR RADIO-BASED NETWORKS

(71) Applicant: Amazon Technologies, Inc., Seattle, WA (US)

(72) Inventors: Nikolay Krasilnikov, Seattle, WA (US); Theodore Joseph Maka'iwi DeRego, Shoreline, WA (US); Benjamin Wojtowicz, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 441 days.

(21) Appl. No.: 17/937,199

(22) Filed: Sep. 30, 2022

(65) Prior Publication Data
US 2024/0114070 A1    Apr. 4, 2024

(51) Int. Cl.
H04L 67/1095    (2022.01)
H04W 56/00    (2009.01)

(52) U.S. Cl.
CPC ....... H04L 67/1095 (2013.01); H04W 56/001 (2013.01)

(58) Field of Classification Search
CPC .......................... H04L 67/1095; H04W 56/001
See application file for complete search history.

(56) References Cited

U.S. PATENT DOCUMENTS 11,356,500 B1    6/2022    Gupta et al.
11,888,701 B1 *   1/2024    Liu ........................ H04L 41/12
2019/0110268 A1*  4/2019    Abedini .................. H04L 45/04
2020/0028564 A1*  1/2020    Agiwal .................. H04M 3/537
2020/0084819 A1*  3/2020    Abedini ................ H04W 76/15
2021/0399956 A1  12/2021    Bogineni et al.
2022/0078728 A1*  3/2022    Yi ........................ H04W 48/16
2022/0116335 A1   4/2022    Sharma Banjade et al.
2022/0311744 A1   9/2022    Shevade et al.
2023/0019773 A1*  1/2023    Raymond ............. H04W 40/02
2023/0055306 A1*  2/2023    Ghadge ............ H04W 28/0215

(Continued)

FOREIGN PATENT DOCUMENTS

CN    110266523 A  *  9/2019    ......... H04L 41/0823
CN    111107542 A  *  5/2020    ............ H04W 24/04

(Continued)

OTHER PUBLICATIONS

International Search Report and Written Opinion for PCT/US23/75559 mailed Jan. 26, 2024.

*Primary Examiner* — Shean Tokuta
(74) *Attorney, Agent, or Firm* — Perilla Knox & Hildebrandt LLP; Thomas B. Hildebrandt

(57) ABSTRACT

Disclosed are various embodiments for a distributed and synchronized core in a radio-based network. In one embodiment, a first radio access network (RAN)-enabled edge server at a first edge location is configured to perform a set of distributed unit (DU) functions for a radio-based network. The first RAN-enabled edge server is also configured to perform a set of core network functions and a set of centralized unit (CU) functions for the radio-based network. State associated with the set of core network functions and the set of CU functions is synchronized between the first RAN-enabled edge server and another server.

20 Claims, 11 Drawing Sheets

(56) References Cited

U.S. PATENT DOCUMENTS

| | | | | |
|---|---|---|---|---|
| 2023/0117359 | A1* | 4/2023 | Kadiri | H04W 56/001 |
| | | | | 370/503 |
| 2023/0189376 | A1* | 6/2023 | Fiorani | H04L 1/08 |
| | | | | 370/328 |
| 2023/0337064 | A1* | 10/2023 | Armenta | H04W 28/14 |
| 2024/0056266 | A1* | 2/2024 | Yoon | H04L 5/0048 |
| 2024/0114070 | A1* | 4/2024 | Krasilnikov | H04W 56/001 |
| 2024/0334215 | A1* | 10/2024 | Pal | H04L 41/0654 |

FOREIGN PATENT DOCUMENTS

| | | | | | |
|---|---|---|---|---|---|
| CN | 114245452 | A | * | 3/2022 | H04W 56/001 |
| EP | 3818776 | B1 | * | 5/2023 | H04W 76/19 |
| JP | 6564827 | B2 | * | 8/2019 | H04W 16/32 |
| KR | 20190091866 | A | * | 8/2019 | H04Q 11/0067 |
| WO | WO-2018030798 | A1 | * | 2/2018 | H04B 7/0697 |
| WO | WO-2021257778 | A1 | * | 12/2021 | H04W 74/0833 |
| WO | WO-2022026649 | A1 | * | 2/2022 | H04L 65/80 |
| WO | WO-2022035939 | A1 | * | 2/2022 | H04W 56/001 |
| WO | WO-2023274730 | A2 | * | 1/2023 | H04W 92/04 |
| WO | WO-2023030945 | A2 | * | 3/2023 | H04W 24/04 |
| WO | WO-2023229613 | A1 | * | 11/2023 | H04J 3/0667 |

* cited by examiner

DISTRIBUTED AND SYNCHRONIZED NETWORK CORE FOR RADIO-BASED NETWORKS

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
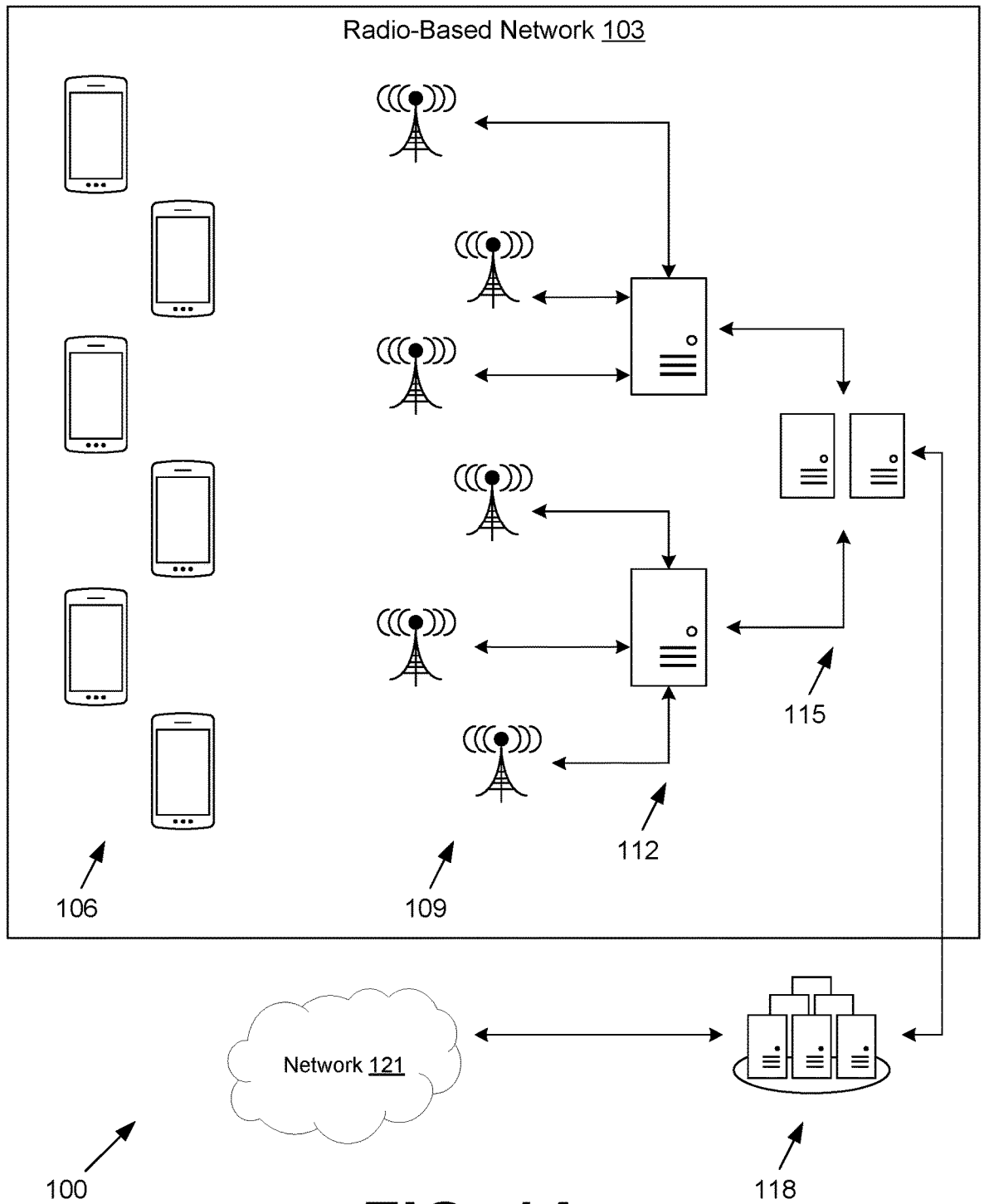
FIG. 1A is a drawing of an example of a communication network that is deployed and managed according to various embodiments of the present disclosure.

The present disclosure relates to a distributed and synchronized network core for radio-based networks. Distributed units (DUs) are computing devices that are typically deployed at cell sites of radio access networks (RANs) in radio-based networks. DUs operate at the lower layers of the RAN protocol stack, such as the Radio Link Control (RLC) sublayer, the Medium Access Control (MAC) sublayer, and the physical layer, depending on the particular implementation. This is in contrast to centralized units (CUs), which may be deployed at centralized locations and provide support for higher layers of the protocol stack, such as the Service Data Adaptation Protocol (SDAP), the Packet Data Convergence Protocol (PDCP), and the Radio Resource Control (RRC) protocol. Together, the DU and CU may correspond to the next generation node B (gNB) in 5G, which enables user equipment (UEs) to connect to the core network. The DUs interface with one or more radio units (RUs) in order to communicate wirelessly with the UEs.

Various embodiments of the present disclosure introduce a DU that may integrate up to a full-stack network core hosted on the DU. In this regard, the DU may support one or more CU network functions and one or more core network functions all on a single computing device at an edge location or multiple computing devices at the edge location. The 5G software stack includes both the core network and the RAN, and all components of this stack need to be available and connected to one another in order for the network to operate. Outages at any level or lost connectivity result in loss of service. In a cloud provider network, the RAN stack may be run at an edge location while the core network is run in a more centralized location such as a region or local zone of the cloud. Beneficially, the disclosed techniques for running the entire network stack on a DU at the edge location, or redundantly on multiple DUs at the edge location, allows for synchronization between multiple instances of the core network, making the network more resilient to lost connectivity or other outages that would otherwise result in loss of full operation of the network. For example, in some implementations the distributed core can be used as a failover if the regional core is not available to the DU. Once the regional core is back online, the DU can synchronize its updated state and again revert to using the regional core.

In a first scenario, the CU network functions and/or core network functions on the DU may serve as a backup if connectivity fails to CU network functions and/or core network functions hosted in a regional data center. With the functional backup, the DU may still provide at least limited connectivity to UEs in the radio-based network, despite the loss of network connectivity from the DU to the regional data center.

In a second scenario, the CU network functions and/or core network functions may be fully distributed on the DUs of the radio-based network. Distributing these network functions may simplify the deployment of the radio-based network and may avoid dedicated network connectivity to a regional data center. In some deployments, the computing device hosting the DU at the edge location may have ample computing resources to accommodate execution of the additional network functions.

The DUs executing the additional network functions may employ a form of state synchronization to maintain consistent operations in the radio-based network. The state to be synchronized may correspond, for example, to lists of registered UE identifiers, network traffic logging data, billing data, and so forth. In a first scenario, the DUs may synchronize state from a CU and/or a core located in a regional or local data center. In a second scenario, the DUs may synchronize state from one or more other DUs. For example, one DU may be elected as a leader, and the other DUs will synchronize state with the leader DU. Alternatively, the DUs may exchange state with each other and operate based upon consensus. In the case that connectivity with the leader DU is lost, another DU may be elected as leader. Through these approaches, the radio-based network becomes more fault tolerant.

The radio-based network may use a core network infrastructure that may be provisioned dynamically and used in conjunction with one or more radio access networks operated by a cloud provider network and/or a plurality of communication service providers. While the radio-based networks may be provisioned on-demand, the radio-based networks may also be scaled up or down or terminated dynamically, thereby providing organizations with the capability to create an ephemeral radio-based network that may exist during a particular time period or periodically according to a schedule. Further, cell sites may be added to or removed from the radio-based network dynamically on demand. In various scenarios, an organization may create either a private radio-based network for internal use only or a radio-based network open to third-party customers using embodiments of the present disclosure.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage and advanced Quality of Service (QoS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency and reliability.

Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks. Further, the disclosed service can provide application development application programming interfaces (APIs) that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) improving fault-tolerance in radio-based networks to allow services to be provided to user equipment even if connectivity to a regional core is lost; (2) improving fault-tolerance in radio-based networks by allowing for election of substitute cores and DUs; (3) improving flexibility in deploying radio-based networks by allowing deployment of CU and core network functions at edge locations; (4) avoiding dedicated network connectivity between an edge location and a regional data center to provide core network functions; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrate the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all of the hardware, software and network functions, required to build a network. In some embodiments, the network functions may be developed and managed by the cloud service provider; however, the described control plane can manage network functions across a range of providers, so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that is deployed and managed according to various embodiments of the present disclosure. The communication network 100 includes a radio-based network (RBN) 103, which may correspond to a cellular network such as a fourth-generation (4G) Long-Term Evolution (LTE) network, a fifth-generation (5G) network, a 4G-5G hybrid core with both 4G and 5G RANs, a sixth-generation (6G) network, or another network that provides wireless network access. The radio-based network 103 may be operated by a cloud service provider for an enterprise, a non-profit, a school system, a governmental entity, a third-party communication service provider, or another organization. Although referred to as a private network, the radio-based network 103 may use private network addresses or public network addresses in various embodiments.

Various deployments of the radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as UE or customer premises equipment (CPE).

The radio-based network 103 can include capacity provisioned on one or more RANs that provide the wireless network access to the plurality of wireless devices 106 through a plurality of cell sites 109. The RANs may be operated by a cloud network provider or different communication service providers. Each of the cell sites 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site. The distributed computing devices 112 may be operated as an extension of a cloud provider network, with DU functions being executed, for example, by a container cluster upon the distributed computing devices 112. Further, the distributed computing devices 112 may be managed by the cloud provider network.

One or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions. In some cases, the centralized computing devices 115 may be located in a data center of a cloud provider network, rather than upon a customer's premises. As described herein, the network functions typically performed by the centralized computing devices 115 may instead be performed by the distributed computing devices 112.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks. The core network sits between the RAN and external networks, such as the Internet and the public switched telephone network, and performs features such as authentication of UE, secure session management, user accounting, and handover of mobile UE between different RAN sites. As described herein, the core network functions typically performed by the core computing devices 118 may instead be performed by the distributed computing devices 112.

Collectively, the radio unit (RU), distributed unit (DU), and central unit (CU) convert the analog radio signal received from the antenna into a digital packet that can be routed over a network, and similarly they convert digital packets into radio signals that can be transmitted by the antenna. This signal transformation is accomplished by a sequence of network functions which can be distributed amongst the RU, DU, and CU in various ways to achieve different balances of latency, throughput, and network performance. These are referred to as "functional splits" of the RAN.

The network functions implemented in the RAN correspond to the lowest three network layers in the seven layer OSI model of computer networking. The physical Layer, PHY, or layer 1 (L1) is the first and lowest layer in the OSI model. In a radio-based network 103, the PHY is the layer that sends and receives radio signals. This can be split into two portions: a "high PHY" and "low PHY." Each of these can be considered a network function. The high PHY converts binary bits into electrical pulses that represent the binary data, and the low PHY then converts these electric pulses into radio waves to be transmitted wirelessly by the antennae. The PHY similarly converts received radio waves into a digital signal. This layer may be implemented by a specialized PHY chip.

The PHY interfaces with the data link layer—layer 2 (L2) in the OSI model. The primary task of the L2 is to provide an interface between the higher transport layers and the PHY. The 5G L2 has three sublayers: media access control (MAC), Radio Link Control (RLC), and Packet Data Convergence Protocol (PDCP). Each of these can be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with layer 3 (L3) in the OSI model, the network layer. The 5G L3 is also referred to as the Radio Resource Control (RRC) layer and is responsible for functions such as packet forwarding, quality of service management, and the establishment, maintenance, and release of a RRC connection between the UE and RAN.

Various functional splits can be chosen for a RAN. The functional splits define different sets of the L1 and L2 functions which are run on the RU versus on the CU and DU. The L3 is also run on the CU. In a RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions. By contrast, in a RAN architecture following split 2, for example, only the PDCP from L2 is handled by the DU and CU, while RLC, MAC, PHY, and radio-frequency signals (RF) are handled by the RU. In split 5, for example, the DU and CU handle PDCP, RLC, and part of the MAC functions, while the RU handles part of the MAC as well as PHY and RF. In split 6, for example, the DU and CU handle PDCP, RLC, MAC, and the RU handles only PHY and RF. In split 8, for example, the DU and CU handle PDCP, RLC, MAC, and PHY, while the RU handles just RF.

Figure 1B:
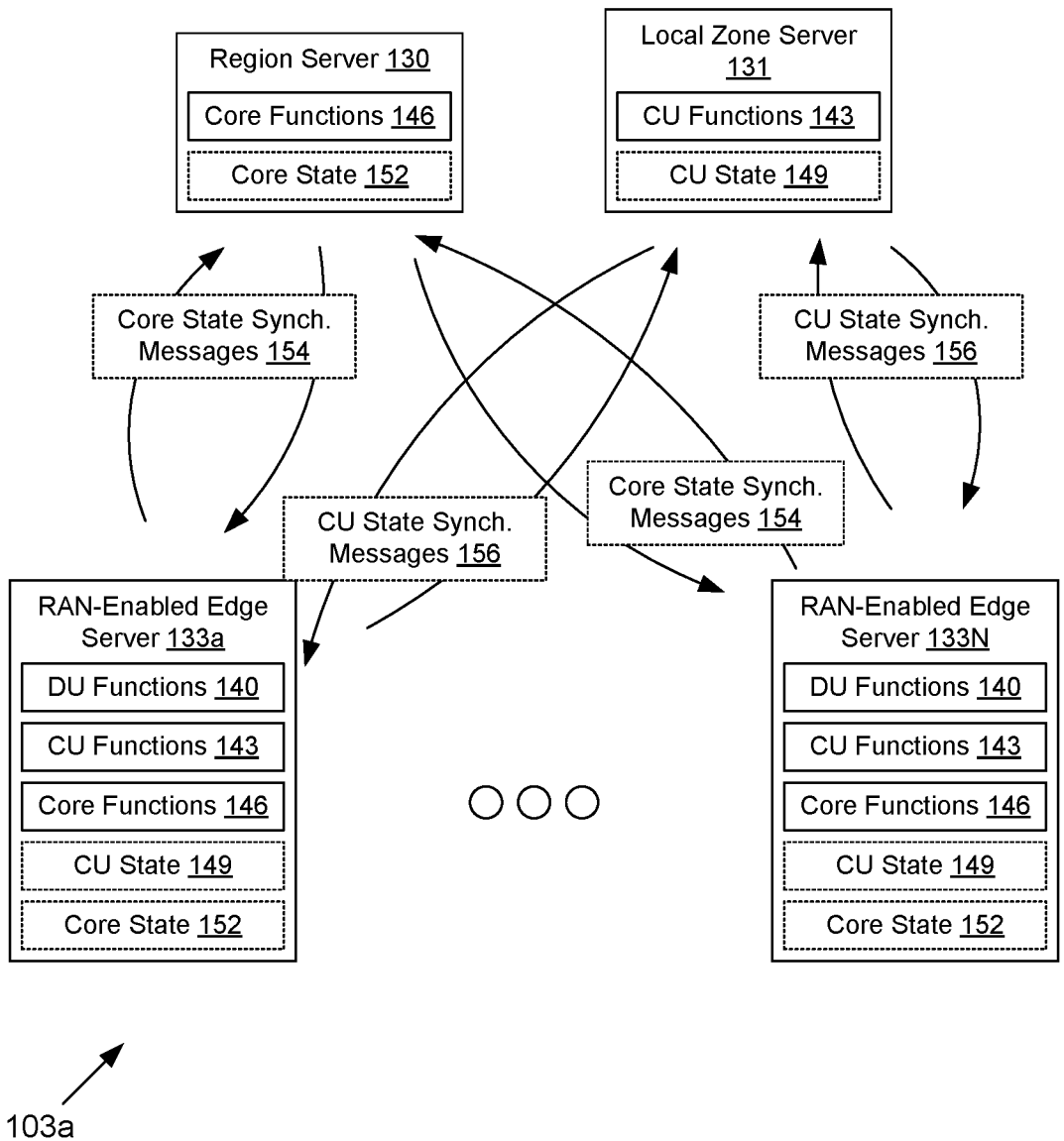
FIGS. 1B and 1C illustrate examples of portions of a radio-based network that utilize a distributed and synchronized core according to one or more embodiments.

FIG. 1B illustrates an example of a portion of a radio-based network 103a that utilizes a distributed and synchronized core according to one or more embodiments. The radio-based network 103a includes one or more region servers 130 and one or more local zone servers 131 that may be in a cloud provider network. The region servers 130 and local zone servers 131 may be in communication with a plurality of radio access network (RAN)-enabled edge servers 133a ... 133N that are located at edge locations (e.g., cell sites 109 (FIG. 1A) in the radio-based network 103a. In some cases, the functionality attributed to the region server 130 may be implemented in the local zone server 131, and the functionality attributed to the local zone server 131 may be implemented in the region server 130.

Each of the RAN-enabled edge servers 133 may perform one or more distributed unit (DU) functions 140, one or more centralized unit (CU) functions 143, one or more core functions 146, and/or other functions. In addition, the RAN-enabled edge servers 133 may store CU state 149 associated with the CU functions 143, core state 152 associated with the core functions 146, and/or other data. The CU state 149 and core state 152 may be generated by the respective CU functions 143 or core functions 146, or may configure the operation of the respective CU functions 143 or core functions 146.

The region server 130 may perform one or more core functions 146 and may store core state 152 associated with the core functions 146. The local zone server 131 may perform one or more CU functions 143 and may store CU state 149 associated with the CU functions 143.

The core state 153 stored by the region server 130 and the RAN-enabled edge servers 133 may be synchronized by way of exchange of core state synchronization messages 154. The CU state 149 stored by the local zone server 131 and the RAN-enabled edge servers 133 may be synchronized by way of the exchange of CU state synchronization messages 156. For example, the CU state synchronization messages 156 and the core state synchronization messages 154 may include new data objects, replacement data objects, and/or replacements of portions of data objects. The CU state synchronization messages 156 and the core state synchronization messages 154 may also include timestamps or other sequence identifiers to ensure that the latest state is synchronized.

In the example of FIG. 1B, each of the RAN-enabled edge servers 133 is configured to synchronize CU state 149 with the local zone server 131 and synchronize core state 152 with the region server 130. The local zone server 131 may be considered to be the leader for synchronizing the CU state 149, or to maintain the canonical copy of the CU state 149. Similarly, the region server 130 may be considered to be the leader for synchronizing the core state 152, or to maintain the canonical copy of the core state 152.

With the synchronization of the core state 152, if the region server 130 goes offline or if connectivity between the RAN-enabled edge servers 133 and the region server 130 is impaired, the RAN-enabled edge server 133 is able to perform the respective core functions 146 using the synchronized core state 152, in place of the region server 130. Likewise, with the synchronization of the CU state 149, if the local zone server 131 goes offline or if connectivity between the RAN-enabled edge servers 133 and the local zone server 131 is impaired, the RAN-enabled edge server 133 is able to perform the respective CU functions 143 using the synchronized CU state 149, in place of the local zone server 131.

Consequently, at least limited network services may be provided to UEs by the respective RAN-enabled edge servers 133 with the locally hosted CU functions 143 and/or core functions 146. While the region server 130 and/or local zone server 131 are unavailable, the RAN-enabled edge servers 133 may elect one of the RAN-enabled edge servers 133 to be the leader for purposes of state synchronization. The election may be controlled by manually configured rules and/or by dynamically determined consensus. When the region server 130 and/or local zone server 131 are back online or if connectivity is restored, the updated core state 152 and/or the updated CU state 149 may be propagated back to the region server 130 and/or local zone server 131 from the leader.

Figure 1C:
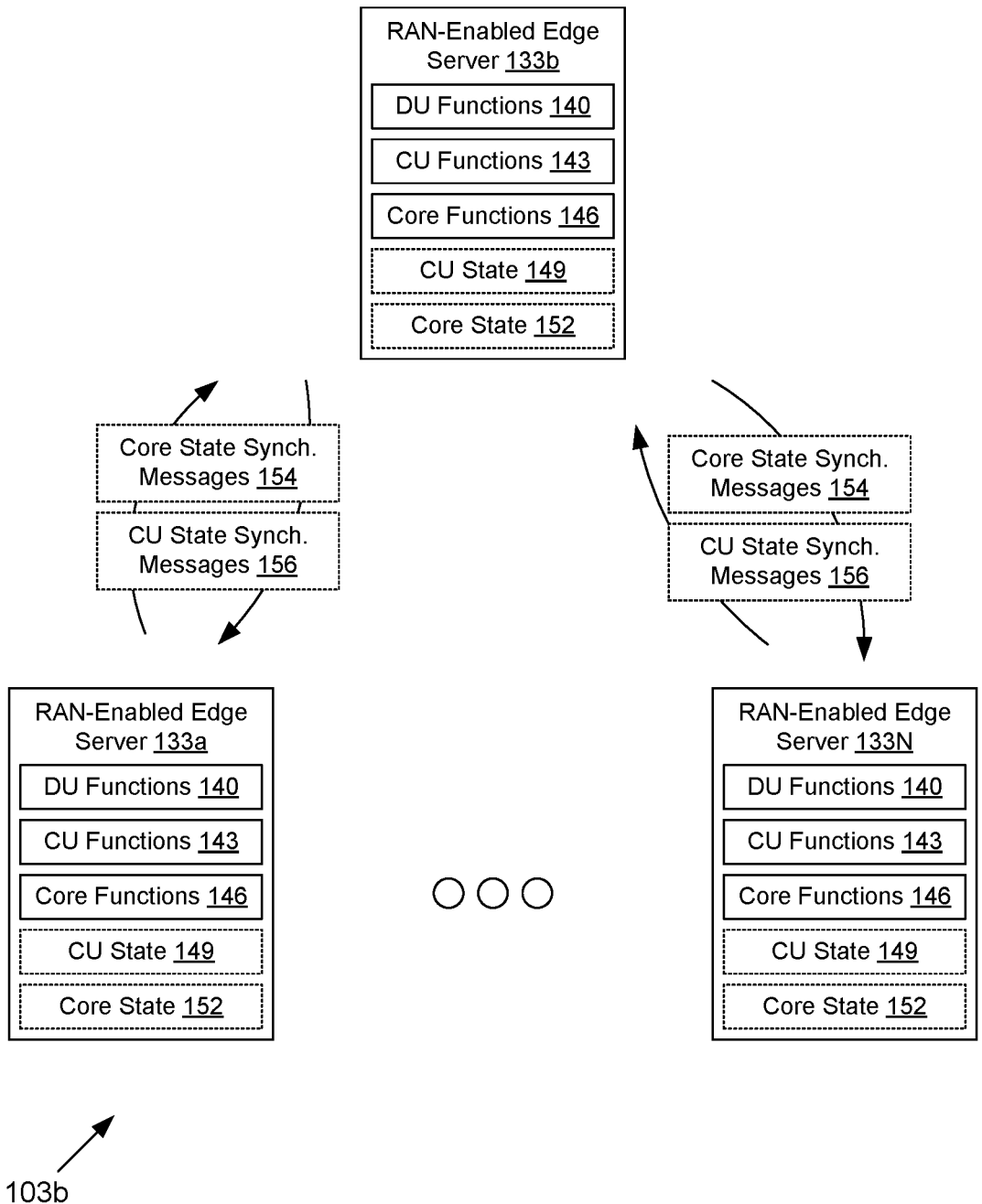

FIG. 1C illustrates another example of a portion of a radio-based network 103b that utilizes a distributed and synchronized core according to one or more embodiments.

The radio-based network 103b includes a plurality of radio access network (RAN)-enabled edge servers 133a, 133b . . . 133N that are located at edge locations (e.g., cell sites 109 (FIG. 1A) in the radio-based network 103b. In lieu of using a region server 130 (FIG. 1B) to provide core functions 146 or using a local zone server 131 (FIG. 1B) to provide CU functions 143, each of the RAN-enabled edge servers 133 may semi-independently execute a full-stack of DU functions 140, CU functions 143, and core functions 146 to service UEs connecting at a respective cell site 109.

To maintain synchronization of the CU state 149 and/or core state 152, the RAN-enabled edge servers 133 may elect a leader, such as the RAN-enabled edge server 133b. The election may be controlled by manually configured rules and/or by dynamically determined consensus. The leader may maintain canonical copies of the CU state 149 and/or the core state 152. The follower RAN-enabled edge servers 133 may send core state synchronization messages 154 and/or CU state synchronization messages 156 to the leader, and the follower RAN-enabled edge servers 133 may receive core state synchronization messages 154 and/or CU state synchronization messages 156 from the leader. In some cases, the CU states 149 and/or core states 152 are maintained generally as replicas at each edge location. In other cases, the CU state 149 and/or the core state 152 may be horizontally partitioned into a plurality of data shards, and respective RAN-enabled edge servers 133 may store one or more particular data shards.

If the leader should go offline or if connectivity with other RAN-enabled edge servers 133 is impaired, the remaining RAN-enabled edge servers 133 may elect a replacement leader to continue synchronization. Meanwhile, the DU functions 140, CU functions 143, and core functions 146 may continue operation in the remaining RAN-enabled edge servers 133 in order to provide at least limited network services to UEs via their respective cell sites 109.

Figure 2A:
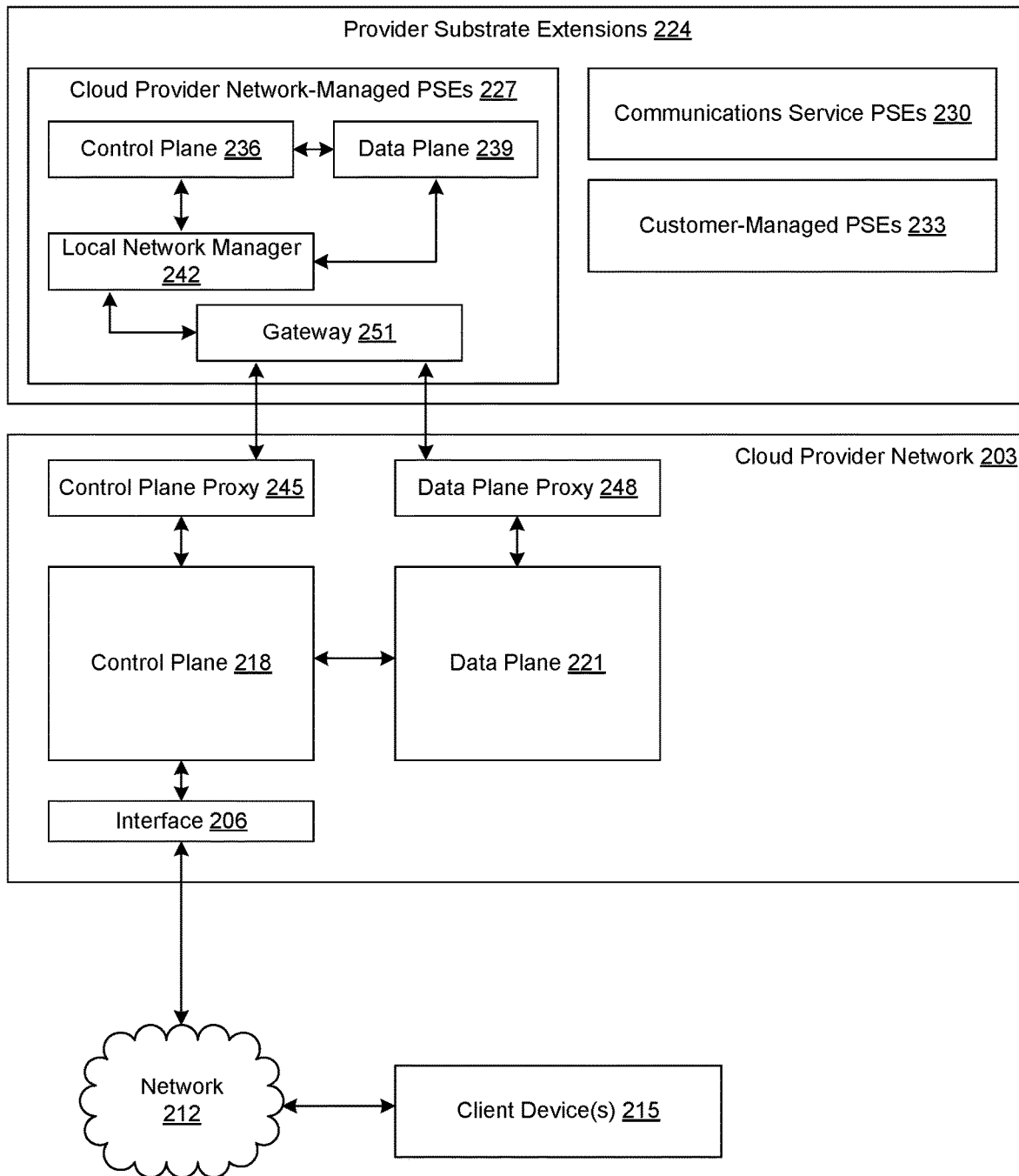
FIG. 2A illustrates an example of a networked environment including a cloud provider network and further including various provider substrate extensions of the cloud provider network, which may be used in various locations within the communication network of FIG. 1A, according to some embodiments of the present disclosure.

FIG. 2A illustrates an example of a networked environment 200 including a cloud provider network 203 and further including various provider substrate extensions of the cloud provider network 203, which may be used in combination with on-premise customer deployments within the communication network 100 of FIG. 1A, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a facility such as a customer's premises or a cellular communication network separate from those associated with the cloud provider network 203 but where such servers are still managed by the cloud provider), communications service provider substrate extensions 230 (e.g., formed by servers associated with communications service provider facilities), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be pre-configured, e.g. by the cloud provider network operator, with an appropriate combination of hardware with software and/or firmware elements to support various types of computing-related resources, and to do so in a manner that mirrors the experience of using the cloud provider network 203. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension 224 includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane 239 extension of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension 224 will remain in the cloud provider network 203 in order to allow customers to use as much resource capacity of the provider substrate extension 224 as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension 224 (as well as resources located in the cloud provider network 203, if desired). The compute instances set up on a server at a provider substrate extension 224 may communicate both with electronic devices located in the same network, as well as with other resources that are set up in the cloud provider network 203, as desired. A local gateway 251 can be implemented to provide network connectivity between a provider substrate extension 224 and a network associated with the extension (e.g., a communications service provider network in the example of a communications service provider substrate extension 230).

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1A, the distributed computing devices 112 (FIG. 1A), the centralized computing devices 115 (FIG. 1A), and the core computing devices 118 (FIG. 1A) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network associated with respective customers. For example, when two communication networks of respective customers share or route traffic through a common point, a provider substrate extension 224 can be connected to both networks. For example, each customer can assign some portion of its network address space to the provider substrate extension 224, and the provider substrate extension 224 can include a router or gateway 251 that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension 224 to a destination on one of the networks can be similarly encapsulated to have the appropriate VLAN tag, source IP address (e.g., from the pool allocated to the provider substrate extension 224 from the destination network address space) and destination IP address.

Figure 2B:
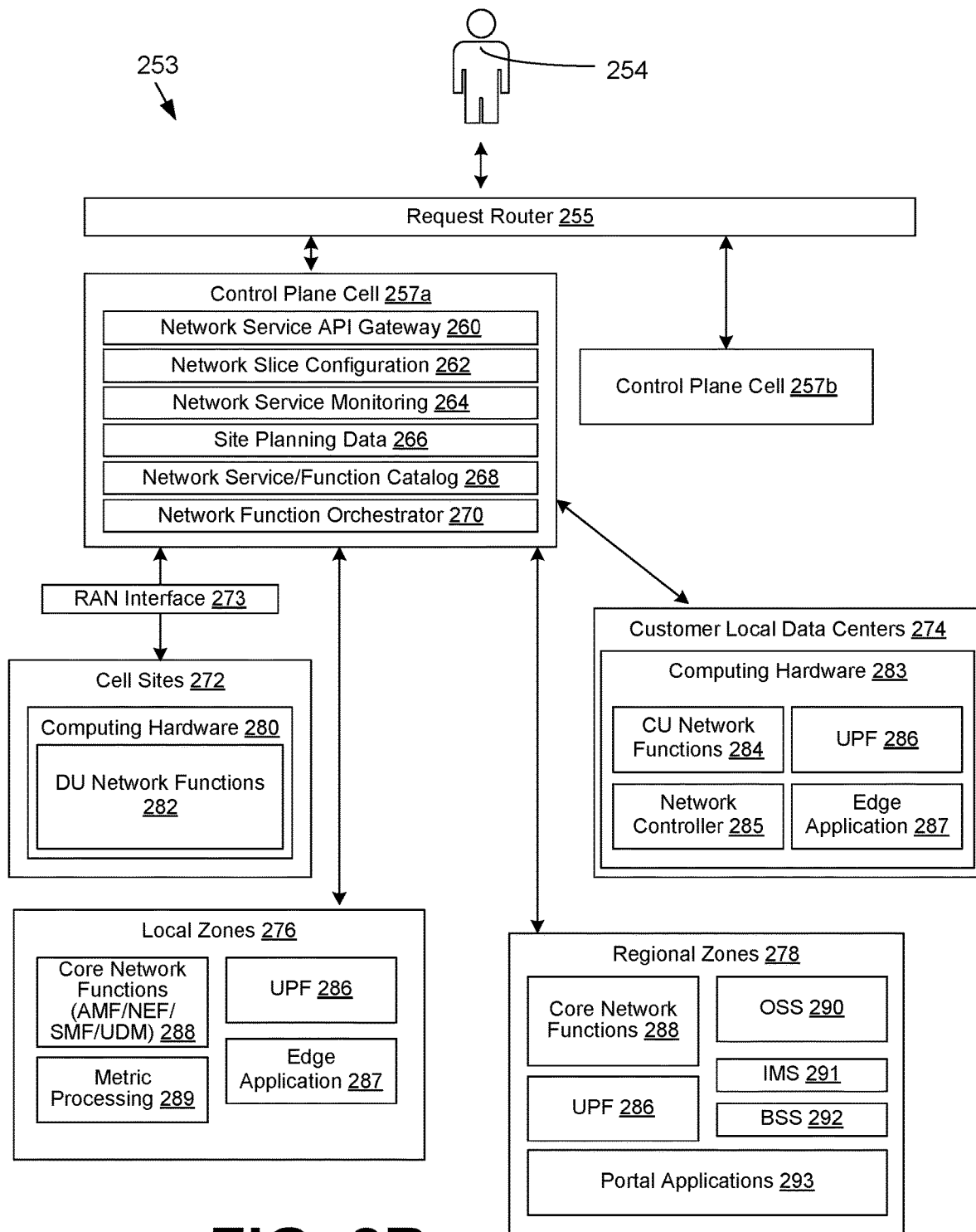
FIG. 2B depicts an example of cellularization and geographic distribution of the communication network of FIG. 1A for providing highly available user plane functions (UPFs).

FIG. 2B depicts an example 253 of cellularization and geographic distribution of the communication network 100 (FIG. 1A) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1A).

The control plane cell 257 may be in communication with one or more cell sites 272 by way of a RAN interface 273, one or more customer local data centers 274, one or more local zones 276, and one or more regional zones 278. The RAN interface 273 may include an application programming interface (API) that facilitates provisioning or releasing capacity in a RAN operated by a third-party communication service provider at a cell site 272. The cell sites 272 include computing hardware 280 that executes one or more distributed unit (DU) network functions 282. The customer local data centers 274 include computing hardware 283 (e.g., a PSE 224) that execute one or more central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287. In some implementations, such core network functions may be run on a PSE 224 which is more local to the PSE 224 running the DU/CU network functions 284, for example the same PSE 224 or another PSE 224 collocated at the same facility.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3A:
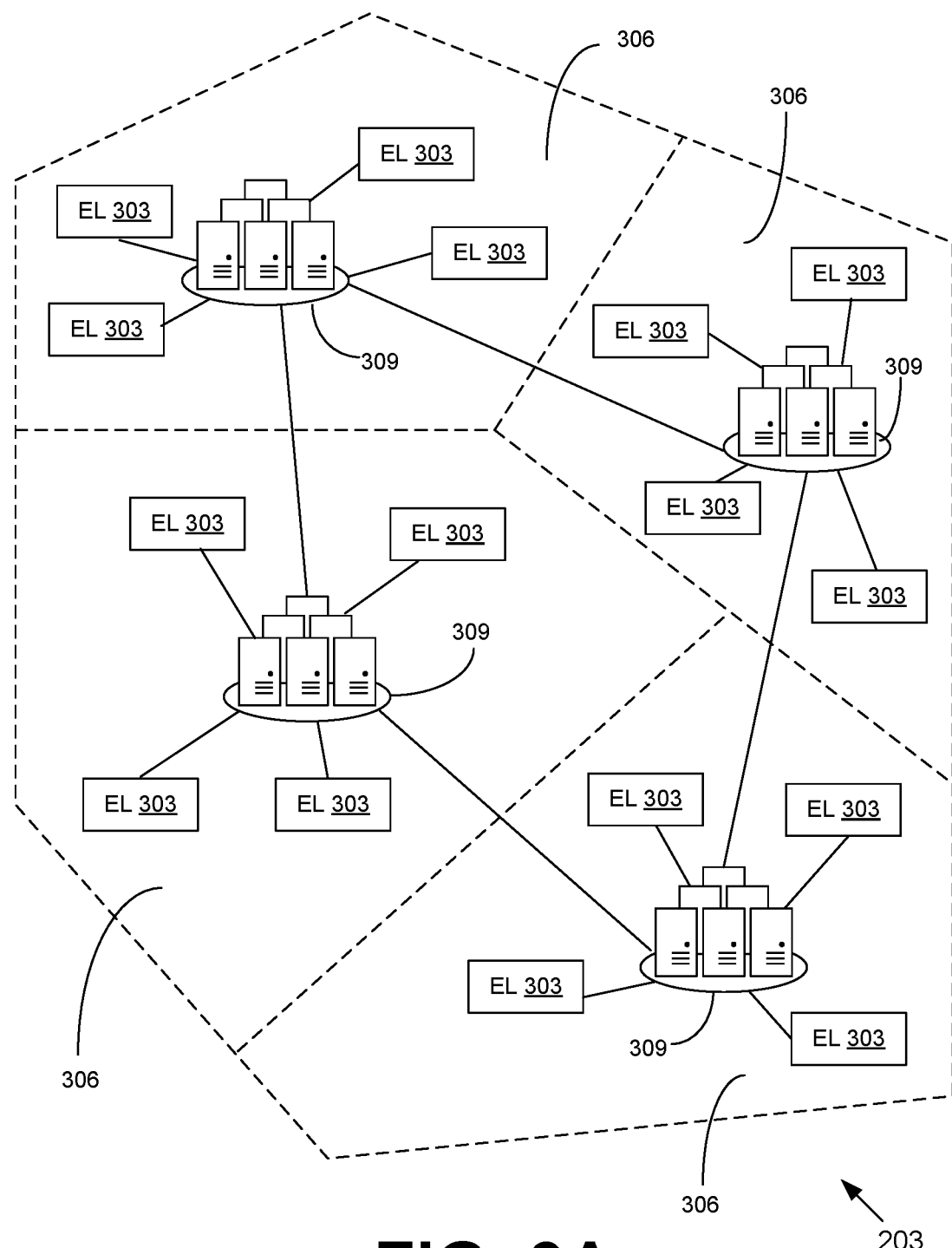
FIG. 3A illustrates an example of the networked environment of FIG. 2A including geographically dispersed provider substrate extensions according to some embodiments of the present disclosure.

FIG. 3A illustrates an exemplary cloud provider network 203 including geographically dispersed provider substrate extensions 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1A), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center 309 or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 3B:
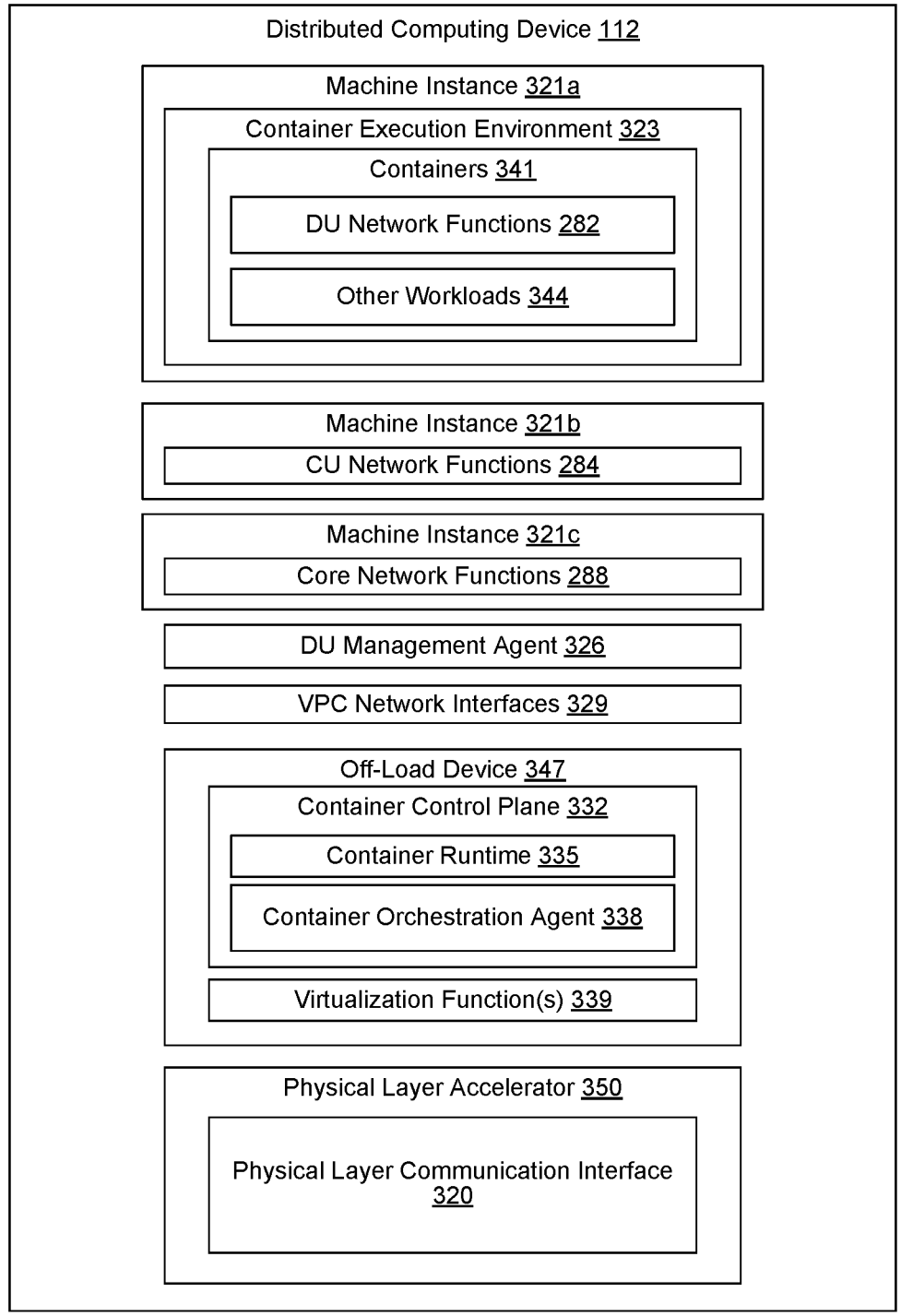
FIG. 3B illustrates an example of a distributed computing device of FIG. 1A according to some embodiments of the present disclosure.

Turning now to FIG. 3B, shown is a distributed computing device 112 according to one or more embodiments. The distributed computing device 112 may be deployed at an edge location 303 (FIG. 3A), such as a cell site 272 (FIG. 2B). The distributed computing device 112 may be connected to one or more radio units (RUs) of the radio-based network 103 (FIG. 1A) via a physical layer communication interface 320. In various embodiments, the distributed computing device 112 may correspond to a provider substrate extension 224 (FIG. 2A) of a cloud provider network 203 (FIG. 2A).

A plurality of machine instances 321 may be executed on the distributed computing device 112. The machine instances 321 may correspond to virtual machine instances or bare-metal machine instances, for example, in the same rack or chassis.

The components executed on the distributed computing device 112 may include, for example, a container execution environment 323, a DU management agent 326, one or more VPC network interfaces 329, a container control plane 332 including a container runtime 335 and a container orchestration agent 338, one or more virtualization functions 339, the physical layer communication interface 320, and/or other components. The container execution environment 323 may be configured to execute a number of different containers 341. In some embodiments, the container execution environment 323 may be executed within a virtual machine instance 321a executed on the distributed computing device 112.

The containers 341 may include containerized versions of DU network functions 282 that perform the functions of the DU in the radio-based network 103. The containers 341 may also correspond to other workloads 344, which in various examples, may correspond to CU network functions 284 (FIG. 2B), core network functions 288 (FIG. 2B), a UPF 286, and/or other functions or portions thereof relating to the radio-based network 103. In some embodiments, a machine instance 321b may execute the CU network functions 284, and a machine instance 321c may execute the core network functions 288. The CU network functions 284 may be executed in the same machine instance 321 or in different machine instances 321 as shown. The state associated with the CU network functions 284 and/or the core network functions 288 may be stored in the same respective machine instance 321 or in a different machine instance 321.

The other workloads 344 may also correspond to arbitrary customer workloads that are not involved in implementing the radio-based network 103 but may be latency sensitive. Therefore, such customer workloads may benefit from being executed at the edge location 303 rather than elsewhere in the cloud provider network 203 (FIG. 2A).

A container 341, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers 341 at runtime. Containers 341 are thus an abstraction of the application layer (meaning that each container simulates a different software application process). Though each container 341 runs isolated processes, multiple containers 341 can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers 341 can be run on instances that are running a container agent, and some containers 341 can be run on bare-metal servers.

The virtualization functions 339 may correspond to functions that enable one or more virtual machine instances to be executed on the distributed computing device 112. To this end, the virtualization functions 339 may correspond to a hypervisor, an operating system in which the hypervisor is executed, and/or other functions. The virtualization functions 339 may also facilitate access to the VPC network interfaces 329 by virtual machine instances and/or containers 341, including performing functions for the VPC network interfaces 329 such as encapsulation, decapsulation, encryption, decryption, and so on.

In some embodiments, the distributed computing device 112 may include an off-load device 347 and a physical layer accelerator 350. The off-load device 347 and the physical layer accelerator 350 respectively correspond to special purpose computing hardware in the distributed computing device 112. The off-load device 347 and the physical layer accelerator 350 may individually have a separate processor and memory by which to execute virtualization or management functions such as the container control plane 332, the virtualization functions 339, and/or the physical layer communication interface 320 so that the container control plane 332 and the physical layer communication interface 320 not use processor and memory resources of the distributed computing device 112.

In some embodiments, in addition to the physical layer communication interface 320 that optimizes DU to RU Layer 1 communication, the physical layer accelerator 350 may integrate network interface card hardware for one or more inbound and/or outbound network ports. For example, such network ports may correspond to Ethernet ports, fiber optic ports, and so forth. In one embodiment, the machine instance 321a has access to the physical layer accelerator 350, while the machine instances 321b and 321c do not.

The distributed computing device 112 includes one or more processors and one or more memories that are coupled to a local hardware interconnect interface such as a bus. The off-load device 347 and the physical layer accelerator 350 are also coupled to the local hardware interconnect interface, for example, by way of a Peripheral Component Interconnect (PCI) or PCI Express (PCIe) bus. For example, the off-load device 347 and the physical layer accelerator 350 may individually correspond to a physical card that is pluggable into a connector on the bus. The processors of the distributed computing device 112, the off-load device 347, and the physical layer accelerator 350 may have different processor architectures. For example, one processor may have an x86 architecture, while the other processor may have an ARM architecture. The off-load device 347 and the physical layer accelerator 350 may individually have a memory that is separate from the memory of the distributed computing device 112.

Non-limiting examples of the container runtime 335 may include containerd, CRI-O, DOCKER, and so on. The container runtime 335 may meet a Runtime Specification of the Open Container Initiative. The container orchestration agent 338 is executed to manage the lifecycle of container 341, including provisioning, deployment, scaling up, scaling down, networking, load balancing, and other functions. Non-limiting examples of commercially available container orchestration agents 338 include KUBERNETES, APACHE MESOS, DOCKER orchestration tools, and so on.

The DU management agent 326 may be executed to perform management functions for the distributed computing device 112 on behalf of the cloud service provider 203 or the customer associated with the radio-based network 103. Such functions may include updating versions of the DU network functions 282, shifting other workloads 344 to or from the distributed computing device 112, updating operating system or virtualization software on the distributed computing device 112, and/or other functions. In some cases, the DU management agent 326 may enable live migration. For example, as new or updated versions of the container runtime 335, the container orchestration agent 338, or the DU network functions 282 become available, the DU management agent 326 may replace the previous versions without rebooting or terminating the affected distributed computing device 112 or a machine instance executed thereon. In some embodiments, the DU management agent 326 may be executed in an off-load device 347.

The VPC network interfaces 329 provide connectivity between the DU network functions 282 and DU network functions 282 on other distributed computing devices 112 via a virtual private cloud network connection. The VPC network interfaces 329 may also provide connectivity between the DU network functions 282 and CU network functions 284 executed by other machine instances or other computing devices in a cloud provider network 202 also using a virtual private cloud network connection.

Figure 4:
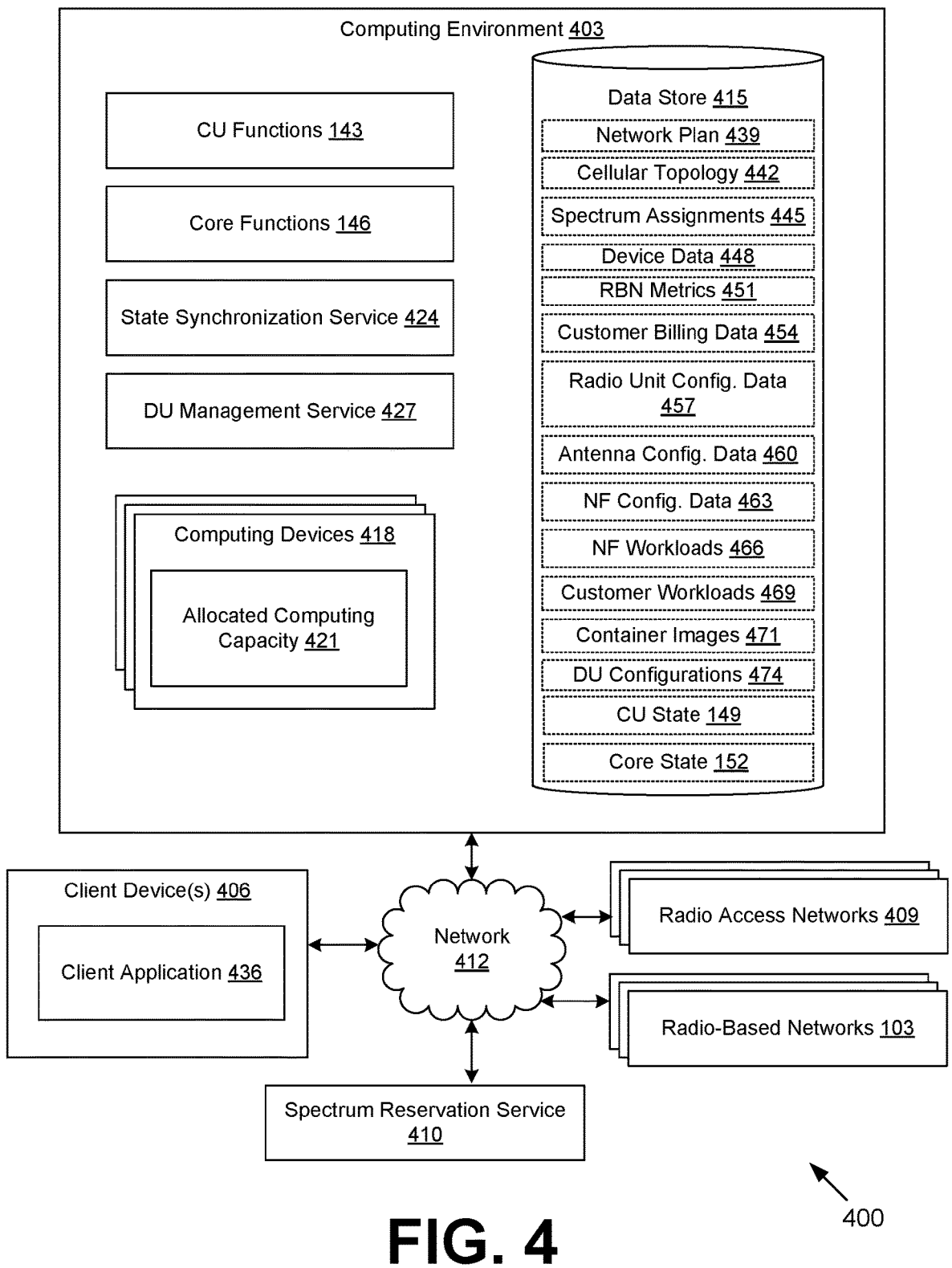
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more radio access networks (RANs) 409, a spectrum reservation service 410, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks. The RANs 409 may be operated by a plurality of different communication service providers. In some cases, one or more of the RANs 409 may be operated by a cloud provider network 203 (FIG. 2A) or a customer of the cloud provider network 203.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include one or more CU functions 143, one or more core functions 146, a state synchronization service 424, a DU management service 427, and other applications, services, processes, systems, engines, or functionality not discussed in detail herein.

The state synchronization service 424 is executed to maintain synchronization of CU state 149 and/or core state 152 for a radio-based network 103. In this way, the state synchronization service 424 may exchange core state synchronization messages 154 (FIGS. 1B and 1C) and CU state synchronization messages 156 (FIGS. 1B and 1C) with various RAN-enabled edge servers 133 (FIGS. 1B and 1C) in a radio-based network 103, aggregate the messages, and develop a canonical copy of the CU state 149 and/or core state 152. Corresponding state synchronization agents may also be executed on the RAN-enabled edge servers 133 to facilitate synchronization. In some cases, a centralized state synchronization service 424 is absent and replaced with the state synchronization agents on the RAN-enabled edge servers 133.

The DU management service 427 is executed to deploy and manage distributed computing devices 112 (FIG. 3B), such as RAN-enabled edge servers 133, performing DU network functions 282 (FIG. 3B). In one embodiment, the DU management service 427 coordinates DU management activities via a respective DU management agent 326 executed on the distributed computing devices 112. For example, the DU management service 427 provisions DUs in response to a customer specifying a DU group, location, and physical location for the DU. The DU management service 427 may also provision VPC network interfaces 329 to enable connectivity between the DUs and between DUs and CUs. Once the distributed computing device 112 is powered up, the DU network functions 282 may join the radio-based network 103 and be staged automatically. The DU management service 427 may also orchestrate container management and live update functions for the distributed computing devices 112.

The DU management service 427 may transfer computing capacity from network function workloads to customer workloads, and vice versa. Further, unused computing capacity may be transferred from one customer or one radio-based network 103 to another. Also, network function workloads may be transferred between distributed computing devices 112 (FIG. 1A) at cell sites 109 (FIG. 1A), centralized computing devices 115 (FIG. 1A) at customer sites, and core computing devices 118 (FIG. 1A) at data centers.

The data stored in the data store 415 includes, for example, one or more network plans 439, one or more cellular topologies 442, one or more spectrum assignments 445, device data 448, one or more RBN metrics 451, customer billing data 454, radio unit configuration data 457, antenna configuration data 460, network function configuration data 463, one or more network function workloads 466, one or more customer workloads 469, one or more container images 471, one or more DU configurations 474, CU state 149, core state 152, and potentially other data.

The network plan 439 is a specification of a radio-based network 103 to be deployed for a customer. For example, a network plan 439 may include premises locations or geographic areas to be covered, a number of cells, device identification information and permissions, a desired maximum network latency, a desired bandwidth or network throughput for one or more classes of devices, one or more quality of service parameters for applications or services, one or more routes to be covered by the RBN 103, a schedule of coverage for the RBN 103 or for portions of the RBN 103, a periodic schedule of coverage for the RBN 103 or for portions of the RBN 103, a start time for the RBN 103 or for portions of the RBN 103, an end time for the RBN 103 or for portions of the RBN 103, and/or other parameters that can be used to create a radio-based network 103. A customer may manually specify one or more of these parameters via a user interface. One or more of the parameters may be prepopulated as default parameters. In some cases, a network plan 439 may be generated for a customer based at least in part on automated site surveys using unmanned aerial vehicles. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc. In some cases, the network plan 439 may incorporate thresholds and reference parameters determined at least in part on an automated probe of an existing private network of a customer.

The cellular topology 442 includes an arrangement of a plurality of cells for a customer that takes into account reuse of frequency spectrum where possible given the location of the cells. The cellular topology 442 may be automatically generated given a site survey. In some cases, the number of cells in the cellular topology 442 may be automatically determined based on a desired geographic area to be covered, availability of backhaul connectivity at various sites, signal propagation, available frequency spectrum, and/or on other parameters. For radio-based networks 103, the cellular topology 442 may be developed to cover one or more buildings in an organizational campus, one or more schools in a school district, one or more buildings in a university or university system, and other areas.

The spectrum assignments 445 include frequency spectrum that is available to be allocated for radio-based networks 103 as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing wireless devices 106 that are permitted to connect to the radio-based network 103. This device data 448 includes corresponding users, account information, billing information, data plans, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on.

The RBN metrics 451 include various metrics or statistics that indicate the performance or health of the radio-based network 103. Such RBN metrics 451 may include bandwidth metrics, dropped packet metrics, signal strength metrics, latency metrics, and so on. The RBN metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The radio unit configuration data 457 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based network 103. In various embodiments, the network functions may be deployed in VM instances or containers located in computing devices 418 that are at cell sites, at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions.

The customer workloads 469 correspond to machine images, containers, or functions of the customer that may be executed alongside or in place of the network function workloads 466 in the allocated computing capacity 421. For example, the customer workloads 469 may provide or support a customer application or service. In various examples, the customer workloads 469 relate to factory automation, autonomous robotics, augmented reality, virtual reality, design, surveillance, and so on.

The container images 471 may correspond to data representing uninstantiated containers 341 (FIG. 3B). For example, the container images 471 may correspond to the DU network functions 282 and/or other workloads 344 (FIG. 3B). The container images 471 may be associated with a version identifier so that updated versions may be distinguished from older versions. The DU configurations 474 may correspond to configurations of distributed computing devices 112 that can be deployed by the DU management service 427 to the distributed computing devices 112. For example, the DU configurations 474 may correspond to one or more virtual machine images or container images 471. There may be default DU configurations 474 and/or DU configurations 474 that are specific to radio-based networks 103 or customers.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum reservation service 410 provides reservations of frequency spectrum for customers' use in RANs 409. In one scenario, the spectrum reservation service 410 is operated by an entity, such as a third party, to manage reservations and coexistence in publicly accessible spectrum. One example of such spectrum may be the Citizens Broadband Radio Service (CBRS). In another scenario, the spectrum reservation service 410 is operated by a telecommunications service provider in order to sell or sublicense portions of spectrum owned or licensed by the provider.

Figure 5:
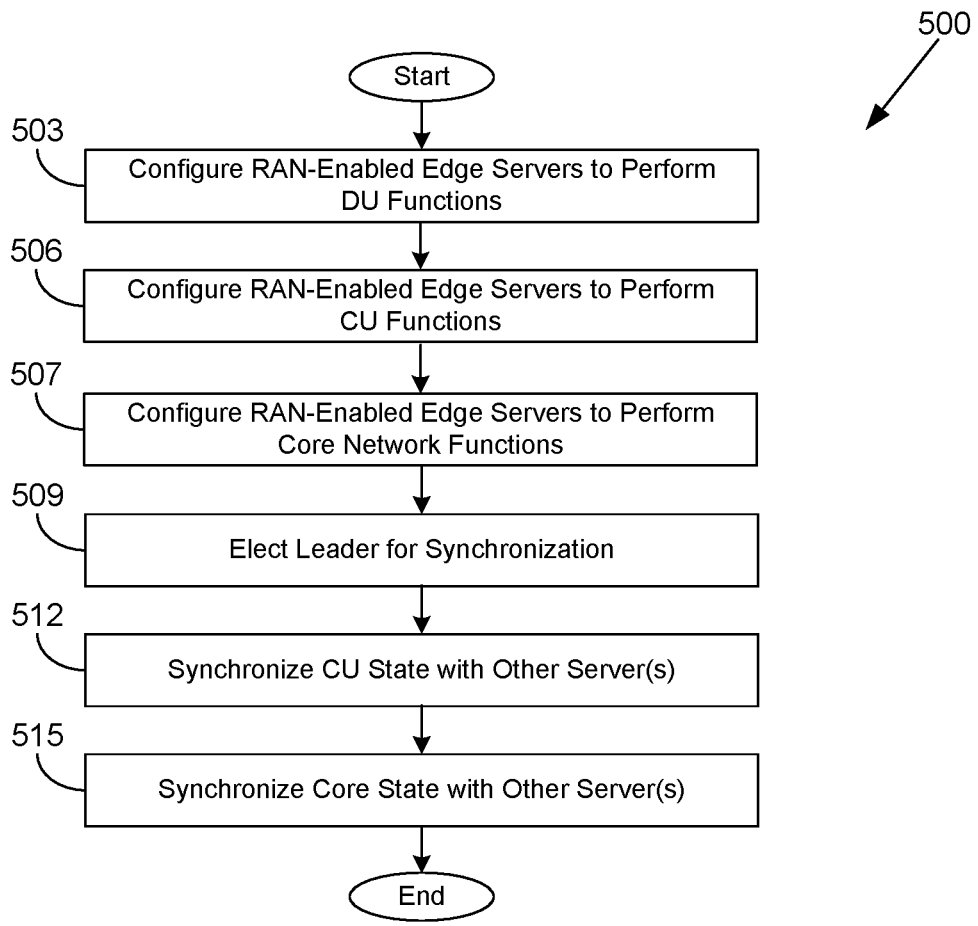
FIG. 5 is a flowchart illustrating an example of functionality implemented as portions of a radio-based network in the networked environment of FIG. 4 according to various embodiments of the present disclosure.

Referring next to FIG. 5, shown is a flowchart 500 that provides one example of the operation of a portion of the radio-based network 103 according to various embodiments. It is understood that the flowchart 500 provides merely an example of the many different types of functional arrangements that may be employed to implement the operation of the portion of the radio-based network 103 as described herein. As an alternative, the flowchart 500 may be viewed as depicting an example of elements of a method implemented in the computing environment 403 (FIG. 4) according to one or more embodiments.

Beginning with box 503, the DU management service 427 (FIG. 4) configures one or more RAN-enabled edge servers 133 (FIGS. 1B and 1C) to perform one or more DU functions 140 (FIGS. 1B and 1C) for the radio-based network 103. The RAN-enabled edge servers 133 may correspond, for example, to distributed computing devices 112 (FIG. 3B) respectively deployed at edge locations 303 (FIG. 3A) corresponding to cell sites 109 (FIG. 1A). In some embodiments, the RAN-enabled edge servers 133 may correspond to provider substrate extensions 224 (FIG. 2A) of a cloud provider network 203 (FIG. 2A).

In box 506, the DU management service 427 configures one or more of the RAN-enabled edge servers 133 to perform one or more CU functions 143 (FIGS. 1B and 1C) for the radio-based network 103. In box 507, the DU management service 427 configures one or more of the RAN-enabled edge servers 133 to perform one or more core network functions, such as core functions 146 (FIGS. 1B and 1C), for the radio-based network 103. In this way, an individual RAN-enabled edge server 133 at an edge location 303 may execute a full stack of network functions for the radio-based network 103, potentially obviating the need to execute CU functions 143 and/or core functions 146 in a local zone data center or a regional data center of a cloud provider network 203. Alternatively, the CU functions 143 and/or core functions 146 in the RAN-enabled edge servers 133 may be utilized as a failover when connectivity to CU functions 143 and/or core functions 146 in a local zone data center or a region data center is impaired, or if the CU functions 143 and/or core functions 146 in a local zone data center or a region data center otherwise go offline or become unavailable.

In box 509, the radio-based network 103 elects a leader for synchronization purposes. A single leader may be used for synchronizing both CU state 149 (FIG. 4) and core state 152 (FIG. 4), or respective leaders may be used for synchronizing the CU state 149 and for synchronizing the core state 152. The leader may be elected according to a manually configured ruleset, or according to a consensus among the RAN-enabled edge servers 133. The leader(s) may correspond to a RAN-enabled edge server 133 or a server at a regional data center or local zone data center of the cloud provider network 203. RAN-enabled edge servers 133 that are not designated leaders may be designated followers.

In box 512, the radio-based network 103 synchronizes the CU state 149 of a RAN-enabled edge server 133 that is designated a follower with another server that is designated the leader. The other server may correspond to a RAN-enabled edge server 133 or a server at a regional data center or local zone data center of the cloud provider network 203. CU state synchronization messages 156 (FIGS. 1B and 1C) may be exchanged to ensure the state is kept consistent.

In box 515, the radio-based network 103 synchronizes the core state 152 of a RAN-enabled edge server 133 that is designated a follower with another server that is designated the leader. The other server may correspond to a RAN-enabled edge server 133 or a server at a regional data center or local zone data center of the cloud provider network 203. Core state synchronization messages 144 (FIGS. 1B and 1C) may be exchanged to ensure the state is kept consistent. For example, the core state 152 may include a list of user equipment identifiers that identify user equipment devices that are permitted to access the radio-based network 103. In other examples, the core state 152 may include network traffic logging data generated by a UPF, billing data, connection metadata generated by an AMF or SMF, and/or other data. Thereafter, the operation of the portion of the radio-based network 103 ends.

Figure 6:
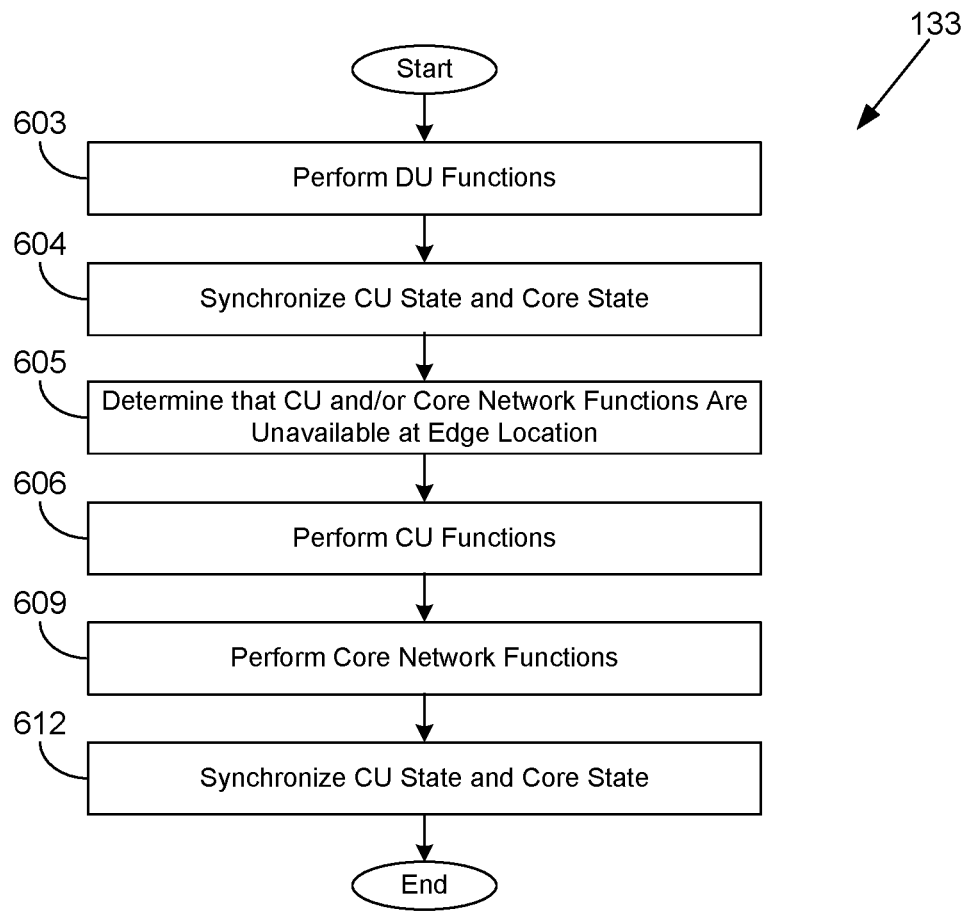
FIG. 6 is a flowchart illustrating an example of functionality implemented as portions of a radio access network (RAN)-enabled edge server in the radio-based network of FIG. 4 according to various embodiments of the present disclosure.

Turning now to FIG. 6, shown is a flowchart that provides one example of the operation of a portion of the RAN-enabled edge server 133 according to various embodiments. It is understood that the flowchart of FIG. 6 provides merely an example of the many different types of functional arrangements that may be employed to implement the operation of the portion of the RAN-enabled edge server 133 as described herein. As an alternative, the flowchart of FIG. 6 may be viewed as depicting an example of elements of a method implemented in the RAN-enabled edge server 133 according to one or more embodiments.

In box 603, the RAN-enabled edge server 133 at an edge location 303 (FIG. 3A) performs DU functions 140 (FIGS. 1B and 1C). In box 604, the RAN-enabled edge server 133 synchronizes the CU state 149 and/or the core state 152 maintained by the RAN-enabled edge server 133 via communication with another server. The other server may be a leader or state may be exchanged on a peer-to-peer basis. At this point, the RAN-enabled edge server 133 may be not performing CU functions 143 and/or core functions 146, but the RAN-enabled edge server 133 may include code for doing so, along with a copy of the synchronized CU state 149 and/or core state 152.

In box 605, the RAN-enabled edge server 133 determines that CU functions 143 and/or core functions 146 are unavailable at the edge location 303. For example, the CU functions 143 and/or core functions 146 for the edge location 303 may have been performed by a server in a regional data center or a local zone data center of a cloud provider network 203. The backhaul link to the cloud provider network 203 may have gone offline or otherwise become impaired, or the servers in the cloud provider network 203 may have gone offline or otherwise become unavailable. Alternatively, the CU functions 143 and/or core functions 146 may have been performed by a different RAN-enabled edge server 133 which has gone offline or to which network connectivity has become impaired.

In box 606, the RAN-enabled edge server 133 begins performing CU functions 143 at the edge location 303 as a failover. In box 609, the RAN-enabled edge server 133 begins performing core functions 146 at the edge location 303 as a failover. As a consequence of performing the CU functions 143 and the core functions 146, the copy of the CU state 149 and/or the core state 152 stored by the RAN-enabled edge server 133 may be modified. In box 612, the RAN-enabled edge server 133 synchronizes the CU state 149 and/or the core state 152 with one or more other servers, such as other RAN-enabled edge servers 133, servers in a regional data center, servers in a local zone data center, and so forth. Such servers may correspond to followers or leaders in various scenarios. Thereafter, the operation of the portion of the RAN-enabled edge server 133 ends.

Figure 7:
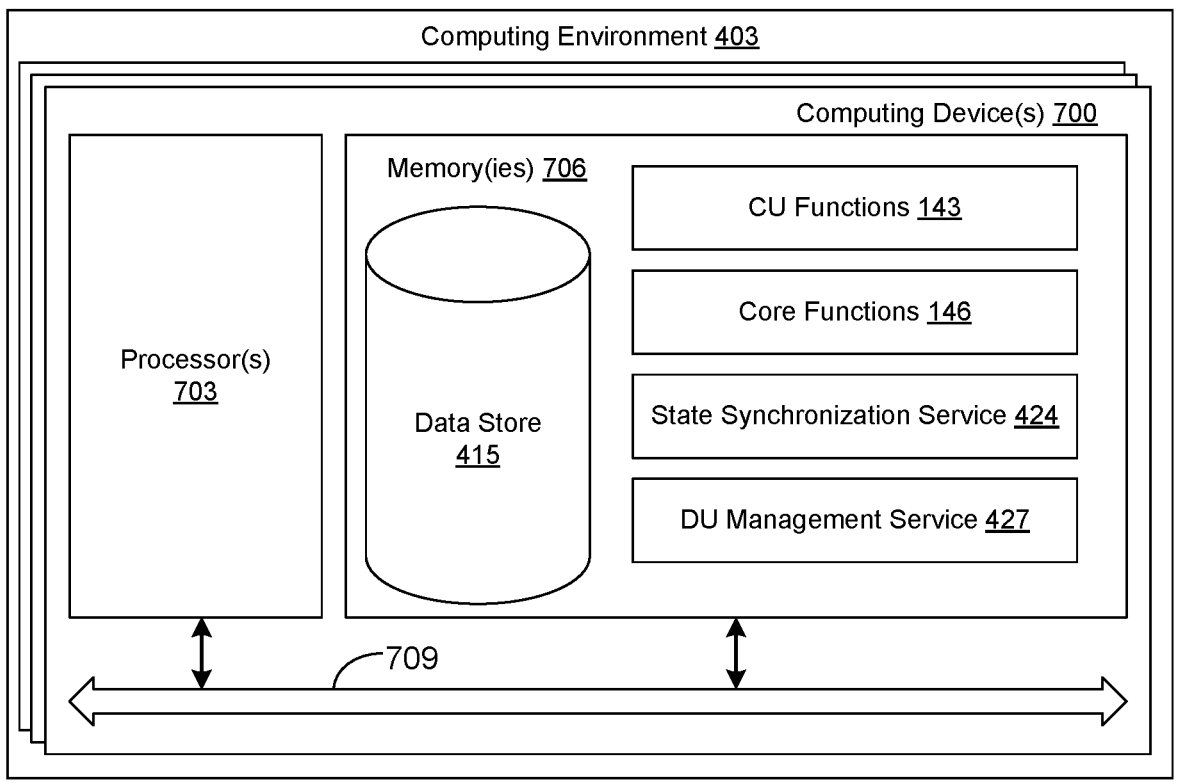
FIG. 7 is a schematic block diagram that provides one example illustration of a computing environment employed in the networked environment of FIG. 4 according to various embodiments of the present disclosure.

With reference to FIG. 7, shown is a schematic block diagram of the computing environment 403 according to an embodiment of the present disclosure. The computing environment 403 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the CU functions 143, the core functions 146, the state synchronization service 424, the DU management service 427, and potentially other applications. Also stored in the memory 706 may be a data store 415 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the CU functions 143, the core functions 146, the state synchronization service 424, the DU management service 427, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6 show the functionality and operation of an implementation of portions of the radio-based network 103 and the RAN-enabled edge server 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the CU functions 143, the core functions 146, the state synchronization service 424, and the DU management service 427, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the CU functions 143, the core functions 146, the state synchronization service 424, and the DU management service 427, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 403.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a first computing device at a first edge location, the first computing device configured to perform a set of distributed unit (DU) functions, a set of centralized unit (CU) functions, and a set of core network functions for a radio-based network;
   a second computing device at a second edge location, the second computing device configured to perform the set of DU functions, the set of CU functions, and the set of core network functions for the radio-based network; and
   wherein the first computing device is configured to synchronize state associated with the set of core network functions and the set of CU functions with the second computing device, and the state comprises at least one of:
   a list of user equipment identifiers that identify a plurality of user equipment devices that are permitted to connect to the radio-based network; or
   network traffic logging data generated by a user plane function included in the set of core functions.

2. The system of claim 1, further comprising a third computing device at a regional data center of a cloud provider network, the third computing device configured to perform the set of core network functions for the radio-based network, the third computing device being configured to synchronize the state with at least one of: the first computing device or the second computing device.

3. The system of claim 1, wherein the first computing device and the second computing device correspond to respective provider substrate extensions of a cloud provider network.

4. The system of claim 1, wherein the state comprises the list of user equipment identifiers.

5. The system of claim 1, wherein the state comprises the network traffic logging data.

6. A system, comprising:
   a first computing device at a first edge location, the first computing device configured to perform a set of distributed unit (DU) functions, a set of centralized unit (CU) functions, and a set of core network functions for a radio-based network;

a second computing device at a second edge location, the second computing device configured to perform the set of DU functions, the set of CU functions, and the set of core network functions for the radio-based network; and wherein the first computing device is configured to synchronize state associated with the set of core network functions and the set of CU functions with the at least one second computing device, at least a portion of the state is horizontally partitioned into a plurality of data shards, the first computing device stores a first data shard of the plurality of data shards, and the second computing device stores a second data shard of the plurality of data shards.

7. A computer-implemented method, comprising:

configuring a first radio access network (RAN)-enabled edge server at a first edge location to perform a set of distributed unit (DU) functions for a radio-based network;

configuring the first RAN-enabled edge server to perform a set of core network functions and a set of centralized unit (CU) functions for the radio-based network; and synchronizing state associated with the set of core network functions and the set of CU functions between the first RAN-enabled edge server and a server in a data center of a cloud provider network;

determining that network connectivity between the first edge location and the data center is impaired; and operating the radio-based network at the first edge location by executing the set of core network functions and the set of CU functions at the first edge location rather than at the data center.

8. The computer-implemented method of claim 7, wherein the set of DU functions are executed in a first machine instance of the first RAN-enabled edge server, the set of CU functions are executed in a second machine instance of the first RAN-enabled edge server, and the set of core network functions are executed in a third machine instance of the first RAN-enabled edge server.

9. The computer-implemented method of claim 7, further comprising enabling at least one of: the set of core network functions or the set of CU functions on the first RAN-enabled edge server in response to determining that the server in the data center is unavailable.

10. The computer-implemented method of claim 7, further comprising synchronizing the state associated with the set of core network functions and the set of CU functions between the first RAN-enabled edge server and a second RAN-enabled edge server at a different edge location.

11. The computer-implemented method of claim 10, further comprising electing the second RAN-enabled edge server as a leader for synchronizing the state.

12. The computer-implemented method of claim 11, further comprising:

determining that the second RAN-enabled edge server is unavailable; and electing a third RAN-enabled edge server at a third edge location as the leader for synchronizing the state.

13. A non-transitory computer-readable medium storing instructions thereon that when executed in a computing device cause the computing device to at least:

configure a first radio access network (RAN)-enabled edge server at a first edge location to perform a set of distributed unit (DU) functions for a radio-based network;

configure the first RAN-enabled edge server to perform a set of core network functions and a set of centralized unit (CU) functions for the radio-based network;

synchronize state associated with the set of core network functions and the set of CU functions between the first RAN-enabled edge server and a second RAN-enabled edge server at a different edge location; and elect the second RAN-enabled edge server as a leader for synchronizing the state.

14. The non-transitory computer-readable medium of claim 13, wherein the set of DU functions are executed in a first machine instance of the first RAN-enabled edge server, the set of CU functions are executed in a second machine instance of the first RAN-enabled edge server, and the set of core network functions are executed in a third machine instance of the first RAN-enabled edge server.

15. The non-transitory computer-readable medium of claim 13, wherein the instructions further cause the computing device to enable at least one of: the set of core network functions or the set of CU functions on the first RAN-enabled edge server in response to determining that the second RAN-enabled edge server is unavailable.

16. The non-transitory computer-readable medium of claim 13, wherein the instructions further cause the computing device to at least:

determine that the second RAN-enabled edge server is unavailable; and elect a third RAN-enabled edge server at a third edge location as the leader for synchronizing the state.

17. The non-transitory computer-readable medium of claim 13, wherein the instructions further cause the computing device to at least synchronize the state associated with the set of core network functions and the set of CU functions between the first RAN-enabled edge server and a server in a data center of a cloud provider network.

18. The non-transitory computer-readable medium of claim 17, wherein the instructions further cause the computing device to at least:

determine that network connectivity between the first edge location and the data center is impaired; and operate the radio-based network at the first edge location by executing the set of core network functions and the set of CU functions at the first edge location rather than at the data center.

19. The non-transitory computer-readable medium of claim 13, wherein at least a portion of the state is horizontally partitioned into a plurality of data shards, the first RAN-enabled edge server stores a first data shard of the plurality of data shards, and the second RAN-enabled edge server stores a second data shard of the plurality of data shards.

20. The non-transitory computer-readable medium of claim 13, wherein the state comprises at least one of:

a list of user equipment identifiers that identify a plurality of user equipment devices that are permitted to connect to the radio-based network; or network traffic logging data generated by a user plane function included in the set of core functions.

* * * * *